United States Patent
Horn (10) Patent No.: US 8,990,925 B2
(45) Date of Patent: Mar. 24, 2015

(54) SECURITY FOR A NON-3GPP ACCESS TO AN EVOLVED PACKET SYSTEM

(75) Inventor: Guenther Horn, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 412 days.

(21) Appl. No.: 12/865,152

(22) PCT Filed: Apr. 2, 2008

(86) PCT No.: PCT/EP2008/053954
§ 371 (c)(1),
(2), (4) Date: Jul. 29, 2010

(87) PCT Pub. No.: WO2009/121407
PCT Pub. Date: Oct. 8, 2009

(65) Prior Publication Data
US 2011/0004762 A1 Jan. 6, 2011

(51) Int. Cl.
*G06F 17/30* (2006.01)
*H04W 12/04* (2009.01)
*H04W 12/06* (2009.01)

(52) U.S. Cl.
CPC .............. *H04W 12/04* (2013.01); *H04W 12/06* (2013.01)
USPC .............................. 726/17; 713/168; 380/270

(58) Field of Classification Search
USPC .............................. 380/270; 726/17; 713/168
See application file for complete search history.

(56) References Cited

U.S. PATENT DOCUMENTS

| 2005/0154907 A1 | 7/2005 | Han et al. | |
| 2008/0248747 A1* | 10/2008 | Buckley | 455/39 |
| 2010/0190500 A1* | 7/2010 | Choi et al. | 455/436 |

FOREIGN PATENT DOCUMENTS

| CN | 101083839 A | | 12/2007 | |
| WO | WO 2007/062882 | * | 6/2007 | H04L 9/08 |

OTHER PUBLICATIONS

3GPP TR 33.821 V0.7.0, 3rd Generation Partnership Project; Technical Specification Group Services and System Aspects; Rationale and Track of Security Decisions in Long Term Evolved (LTE) RAN / 3GPP System Architecture Evolution (SAE) (Release 8), Feb. 2008.
3rd Office Action dated Jan. 27, 2014, issued by the State Intellectual Property Office, P.R. China in corresponding Chinese Application No. 200880128447.X, 6 pages.

* cited by examiner

*Primary Examiner* — Christopher Brown
(74) *Attorney, Agent, or Firm* — Squire Patton Boggs (US) LLP (57) ABSTRACT

A home subscriber server (400) receives a request for authentication information from an authentication server (300) and transforms cryptographic keys for a user equipment (100) into access specific cryptographic keys based on an identity of an authenticator (200) controlling access from the user equipment (100) to an EPS network, and generates the authentication information including the access specific cryptographic keys and a separation indicator which is set. The user equipment (100) checks whether the separation indicator included in the authentication information is set, and if the separation indicator is set, transforms cryptographic keys into access specific cryptographic keys based on the identity of the authenticator (200), and computes a key specific to an authentication method from the access specific cryptographic keys.

16 Claims, 3 Drawing Sheets

SECURITY FOR A NON-3GPP ACCESS TO AN EVOLVED PACKET SYSTEM

FIELD OF THE INVENTION

The present invention relates to security for an Evolved Packet System (EPS). In particular, the invention relates to security for EPS when it is accessed from a non-3GPP (non-Third Generation Partnership Project) access network.

BACKGROUND OF THE INVENTION

EPS is a successor technology of UMTS (Universal Mobile Telecommunications System). Security aspects of EPS depend on whether an access network is a 3GPP-defined access network, e.g. GERAN (GSM (Global System for Mobile communication) EDGE (Enhanced Data rates for Global Evolution) Radio Access Network), UTRAN (UMTS Terrestrial Radio Access Network), E-UTRAN (evolved UTRAN), or a non-3GPP access network, e.g. evolved HRPD (High Rate Packet Data) as defined by 3GPP2 (Third Generation Partnership Project 2), WiMAX (Worldwide Interoperability for Microwave Access) as defined by IEEE (Institute of Electrical and Electronic Engineers) and the WiMAX Forum.

In case the access network is E-UTRAN (also known as LTE (Long Term Evolution)), i.e. a 3GPP-defined access network, a serving network authentication means that a User Equipment (UE) is ensured to communicate with a Mobility Management Entity (MME) in a particular serving network. This is a security feature not known in UMTS.

In order to prevent that this security feature is circumvented by an attacker an additional feature called cryptographic network separation is required. In the following, some more background information is given so that this additional feature can be explained.

In UMTS and in EPS alike, an authentication vector is a collection of parameters, which contains, among others, cryptographic keys CK, IK and a so-called AMF (Authentication Management Field) separation bit. When an attacker knows the keys CK, IK he can impersonate a serving network entity. The keys CK, IK are available in UMTS serving networks in entities SGSN (Serving GPRS (General Packet Radio Service) Support Node) and RNC (Radio Network Controller). Therefore, any compromise of an SGSN or RNC in one UMTS serving network allows an attacker to impersonate another UMTS serving network entity.

EPS users are equipped with a UICC (UMTS Integrated Circuit Card) with a USIM (User Services Identity Module) application for security purposes. User records are held in an HSS (Home Subscriber Server).

Cryptographic network separation of user's security data as specified for EPS rests on the particular handling of the Authentication Management Field (AMF), which is part of the AV (Authentication Vector), in the HSS and a Mobile Equipment (ME). The ME is a User Equipment (UE) without the UICC.

Security procedures between UE and EPC (Evolved Packet Core) network elements comprising ASME (Access Security Management Entity) and HSS including Authentication Centre, comprise an Authentication and key agreement procedure (AKA). The EPS AKA produces keys forming a basis for user plane and control plane protection (ciphering, integrity). EPS AKA is based on following long term keys shared between UE and HSS:
K is the permanent key stored on the USIM (User Services Identity Module) and in the Authentication Centre AuC;
CK, IK is the pair of keys derived in the AuC and on the USIM during an AKA run.

As a result of the authentication and key agreement, an intermediate key K_ASME is generated which is shared between UE and ASME. For E-UTRAN access networks, the ASME is the MME.

The purpose of this procedure is to provide an MME (Mobility Management Entity) with one or more MME security contexts (e.g. K_ASME) including a fresh authentication vector from the user's HSS to perform a number of user authentications.

An MME security context is derived from the authentication vector. To derive the key K_ASME in the HSS, a Key Derivation Function is used which contains input parameters CK, IK and SN (serving network) identity.

EPS introduces cryptographic network separation for the case of E-UTRAN access networks by using the AMF separation bit. This feature makes it impossible for an attacker to steal keys CK, IK from an entity in one serving network, with either UTRAN or E-UTRAN access networks, and use them to impersonate another serving network when the UE is using E-UTRAN access. This feature ensures by cryptographic means that a security breach in one network does not affect another network, hence the name "cryptographic network separation".

In the context of E-UTRAN access to EPS, cryptographic network separation is achieved in the following way:
 a Home Subscriber Server (HSS) uses only authentication vectors with AMF separation bit=1 for E-UTRAN access networks;
 the Home Subscriber Server (HSS) uses only authentication vectors with AMF separation bit=0 for UTRAN access networks;
 when an access is made via E-UTRAN, the HSS does not send CK, IK to another entity outside the HSS, but sends a key derived from CK, IK and a serving network identity to the MME in the serving network; and
 a UE accepts only authentication vectors with AMF separation bit=1 for E-UTRAN access networks.

In the context of non-3GPP access networks, for subscriber authentication, a protocol EAP-AKA (Extensible Authentication Protocol for Authentication and Key Agreement) is used. EAP-AKA is terminated in a 3GPP AAA (Access, Authorization, and Accounting) server, which always resides in a home network. The 3GPP AAA server obtains the keys CK, IK from an HSS (Home Subscriber Server). The keys CK, IK then remain in the 3GPP AAA server, which resides in the home network. Therefore, stealing of CK, IK is not the problem here. However, the 3GPP AAA server produces a Master Session Key (MSK) from CK, IK and then sends the MSK to an authenticator which is an entity controlling an access from a user equipment. In the context of non-3GPP access to EPS, the authenticator can be an entity in a non-3GPP access network in the case of so-called trusted access, or the authenticator can be an evolved Packet Data Gateway (ePDG) in a 3GPP EPS network in the case of so-called untrusted access.

The problem is that the authenticator may be compromised and may use the MSK to impersonate another authenticator in a different network. E.g. a WLAN (Wireless Local Area Network) access point from a 3G-WLAN interworking system may obtain an MSK, and then impersonate an ePDG in an EPS network or an authenticator in an eHRPD network. This would make the security of an EPS network dependent on that of the WLAN access point. But the latter may enjoy quite low physical security and may reside in an exposed location. Furthermore, the backhaul link from this WLAN access point may be weakly protected. This dependency of EPS security on WLAN security is therefore highly undesirable.

SUMMARY OF THE INVENTION

Apparatuses and methods are provided for solving the above problem, which are defined in the appended claims. An embodiment of the invention may also be implemented by a computer program product.

According to an embodiment of the invention, in the context of non-3GPP access to EPS an attacker can be prevented from impersonating an authenticator by compromising another authenticator in a different network. In other words, cryptographic separation of authenticators, and cryptographic separation of networks in which the authenticators reside can be provided in the context of non-3GPP access to EPS.

According to an embodiment of the invention, the EAP-AKA protocol does not have to be changed, and no protocol changes on the authenticators are required.

DESCRIPTION OF EMBODIMENTS OF THE INVENTION

In the following the invention will be described by way of embodiments thereof referring to the accompanying drawings which form part of the specification.

For the purpose of an embodiment of the invention to be described herein below, it should be noted that a user equipment may for example be any device by means of which a user may access a communication network; this implies mobile as well as non-mobile devices and networks, independent of the technology platform on which they are based; only as an example, it is noted that terminals equipped with a UICC (UMTS (Universal Mobile Telecommunications System) Integrated Circuit Card) with a USIM (User Services Identity Module) application for security purposes are particularly suitable for being used in connection with the present invention;

method steps likely to be implemented as software code portions and being run using a processor at one of the entities are software code independent and can be specified using any known or future developed programming language;

method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

As described above, in the context of non-3GPP access networks, for subscriber authentication, the protocol EAP-AKA is used. EAP-AKA is terminated in an AAA server (3GPP AAA server), which, in the context of 3GPP networks, always resides in the home network. The 3GPP AAA server obtains the keys CK, IK from an HSS. The keys CK, IK then remain in the 3GPP AAA server, which resides in the home network. The 3GPP AAA server produces a Master Session Key (MSK) from CK, IK and then sends the MSK to an authenticator which is an entity controlling an access from a user equipment (UE). In the context of non-3GPP access to EPS, the authenticator can be an entity in a non-3GPP access network in the case of so-called trusted access, or the authenticator can be an evolved Packet Data Gateway (ePDG) in a 3GPP EPS network in the case of so-called untrusted access.

According to an embodiment of the invention, the HSS does not send the keys CK, IK to the AAA server, but applies a transformation to obtain keys CK_new, IK_new. The UE applies the same transformation to the keys CK, IK obtained from USIM (UMTS Subscriber Identity Module). The AAA server, an EAP peer on the UE, and the authenticator do not notice this transformation and proceed with EAP-AKA. Moreover, the use of the AMF separation bit is as for E-UTRAN access in so far as the HSS sends authentication vectors with the AMF separation bit set to 1 only to AAA servers when they are used for EPS access, and the UE checks that the AMF separation bit is set to 1 when the UE accesses EPS.

In order to achieve authentication of the authenticator or the serving network to the UE, according to an embodiment of the invention the transformation applied by the HSS and the UE includes a meaningful authenticator or serving network identity, e.g. a Fully Qualified Domain Name of an ePDG, or a Mobile Country Code (MCC) plus Mobile Network Code (MNC) identifying an eHPRD network. The UE and the HSS have the identity in the same form available.

MSK keys derived from CK, IK and from CK_new, IK_new respectively are different. Therefore, e.g. a WLAN access point stealing an MSK derived from CK, IK cannot use this MSK for impersonating an authenticator in the EPS context, as for the latter MSK would have to be derived from CK_new, IK_new.

In the following an implementation example will be described by referring to FIGS. 1 and 2.

Figure 1:
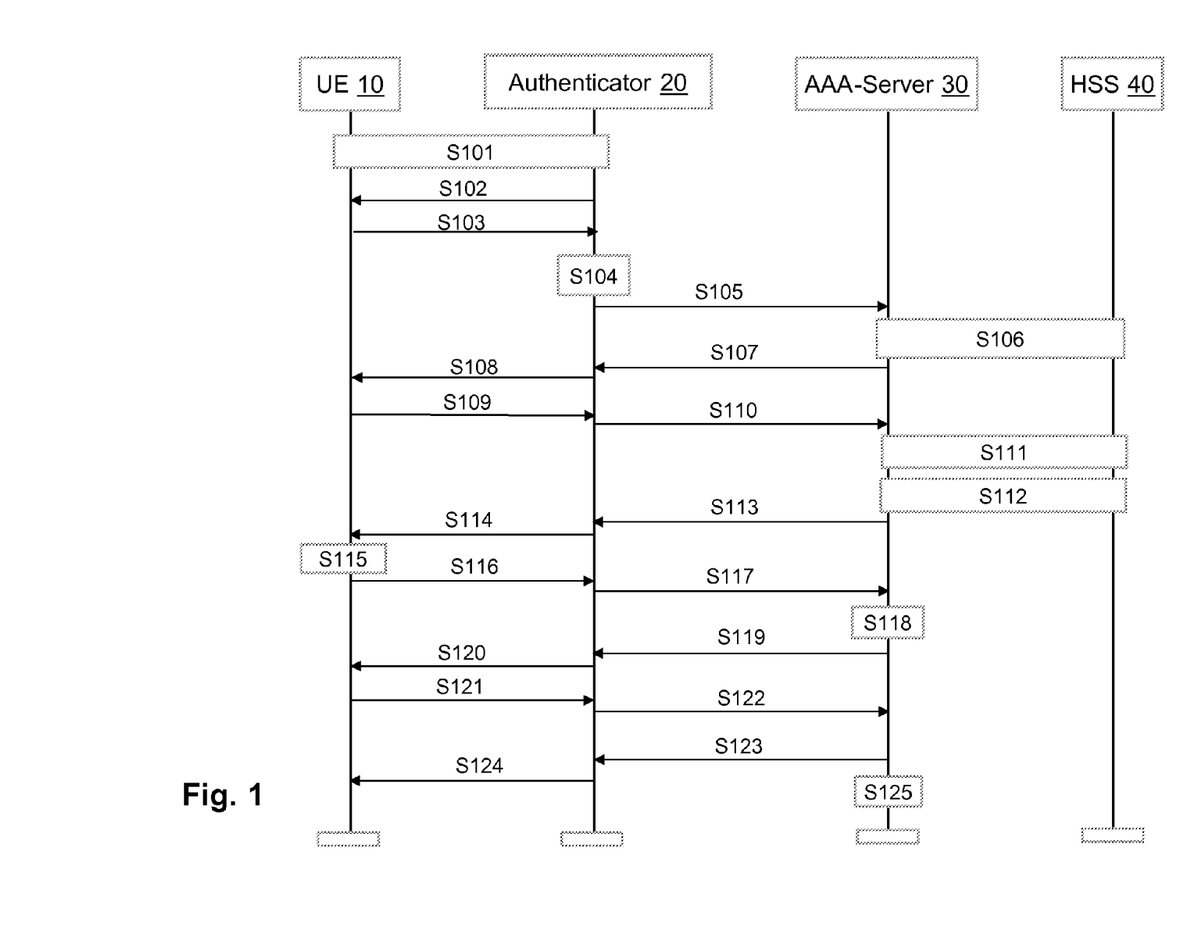
FIG. 1 shows a signalling diagram illustrating authentication and key agreement for trusted access according to an embodiment of the invention.

FIG. 1 shows a signalling diagram illustrating authentication and key agreement for trusted access to EPS from a non-3GPP access network according to an embodiment of the invention.

Figure 2:
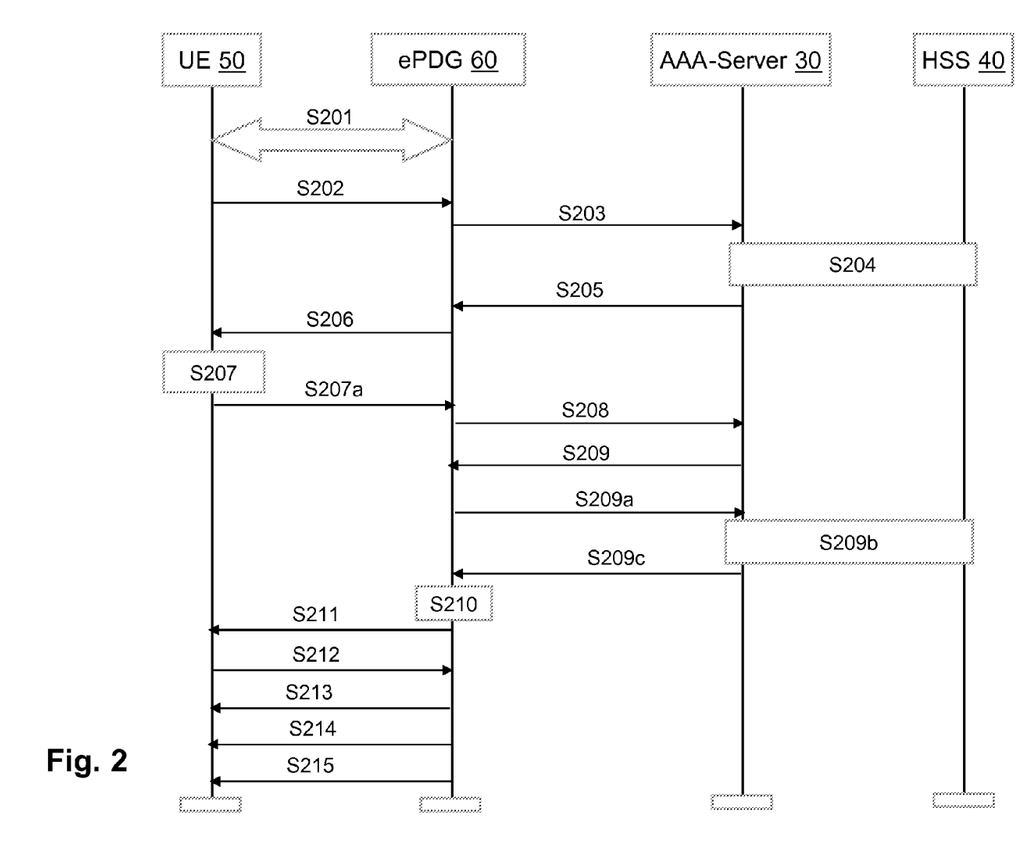
FIG. 2 shows a signalling diagram illustrating authentication and key agreement for untrusted access according to an embodiment of the invention.

FIG. 2 shows a signalling diagram illustrating authentication and key agreement for untrusted access according to an embodiment of the invention.

According to an embodiment of the invention, access authentication for non-3GPP access in EPS is based on EAP-AKA. An AAA server 30 (3GPP AAA server), which resides in an EPC, may act as an EAP server for EAP-AKA.

According to the embodiment, it is assumed that an HSS 40 sends an authentication vector with AMF separation bit=1 to the AAA server 30 if and only if the authentication vector is used with the procedures defined in the embodiment.

According to an embodiment of the invention, the procedure shown in FIG. 1 is performed whenever the procedure shown in FIG. 2 is not performed.

As shown in FIG. 1, in step S101 a connection is established between a UE 10 and a trusted non-3GPP access network, using a procedure specific to the non-3GPP access network.

In step S102, an authenticator 20 in the trusted non-3GPP access network sends an EAP Request/Identity to the UE 10, requesting a user identity. In step S103 the UE 10 sends an EAP Response/Identity message. The UE 10 may send its identity complying with Network Access Identifier (NAI) format. NAI contains either a pseudonym allocated to the UE 10 in a previous run of the authentication procedure or, in the case of first authentication, an IMSI (International Mobile Subscriber Identity). In the case of first authentication, the NAI indicates EAP-AKA.

In step S104 the EAP Response/Identity message is routed towards the AAA server 30 based on a realm part of the NAI. The routing path may include one or several AAA proxies (not shown in FIG. 1). In step S105 the AAA server 30 receives the EAP Response/Identity message that contains the subscriber identity over a Ta*/Wd* interface (not shown).

In step S106 the AAA server 30 checks whether it has an unused authentication vector with AMF separation bit=1 available for that subscriber, i.e. the UE 10. If not, a set of new authentication vectors is retrieved from the HSS 40 in step S106. For this purpose, the AAA server 30 includes an indication that the authentication vector is for EPS use, and the identity of the access network in which the authenticator 20 resides, e.g. MCC+MNC of an eHRPD access network, into a message sent to the HSS 40 in step S106. A mapping from a temporary identifier to an IMSI is required. The HSS 40 retrieves an authentication vector from an Authentication Centre (not shown) with AMF separation bit=1. The HSS 40 then transforms this authentication vector into a new authentication vector by computing (CK_new, IK_new)=F(CK, IK, <access network identity>, <possibly further parameters>) where F is a key derivation function. The HSS 40 then sends this transformed authentication vector to the AAA server 30 in step S106.

It is to be noted that the AAA server 30 does not notice the transformation and treats this authentication vector like any other authentication vector.

In addition, the AAA server 30 may retrieve authentication vectors from the HSS 40 when it detects that a VPLMN (Visited Public Land Mobile Network) selected by a user of the UE 10 has changed. This may happen, for example, when the user is performing a VPLMN re-selection procedure and is initiating a new authentication procedure via a new VPLMN.

The HSS 40 may check if there is a 3GPP AAA Server already registered to serve for this subscriber, i.e. the UE 10. In case the HSS 40 detects that another AAA Server has already registered for this subscriber, it may provide the AAA server 30 with the previously registered AAA server address. The authentication signalling is then routed to the previously registered AAA server with Diameter-specific mechanisms, e.g., the AAA server 30 transfers the previously registered AAA server address to a 3GPP AAA proxy or an AAA entity in the trusted non-3GPP access network, or the AAA server 30 acts as an AAA proxy and forwards the authentication message to the previously registered AAA server.

In step S107, the AAA server 30 requests again the user identity, using the EAP Request/AKA Identity message. This identity request is performed as intermediate nodes may have changed or replaced the user identity received in the EAP Response Identity message. However, this new request of the user identity can be omitted by the home operator if it is assured that the user identity could not have been changed or modified by any means in the EAP Response Identity message.

In step S108, the authenticator 20 in the access network forwards the EAP Request/AKA Identity message to the UE 10. In step S109, the UE 10 responds with the same identity it used in the previous EAP Response Identity message. In step S110, the authenticator 20 in the access network forwards the EAP Response/AKA Identity to the AAA server 30. The identity received in this message will be used by the AAA server 30 in the rest of the authentication process. If an inconsistency is found between the identities received in the two messages (EAP Response Identity and EAP Response/AKA Identity) so that a user profile and authentication vectors previously retrieved from the HSS 40 are not valid, these data may be requested again from the HSS 40. In other words, step S106 may be repeated before continuing with step S111.

In order to optimise performance, the identity re-request process (steps S107 to S110) may be performed before user profile and authentication vectors retrieval.

In step S111 the AAA server 30 checks whether it has an EPS access profile of the UE 10 available. If not, the EPS access profile is retrieved from the HSS 40. The AAA server 30 verifies that the UE 10 is authorized to use the EPS.

It is to be noted that this step could be performed at some other point, after step S105 and before step S114.

In step S112 new keying material is derived from IK_new and CK_new according to EAP-AKA. A new pseudonym and/or re-authentication ID may be chosen and if chosen they should be protected, i.e. encrypted and integrity protected, using keying material generated from EAP-AKA.

In step S113 the AAA server 30 sends RAND, AUTN, a message authentication code (MAC) and two user identities (if they are generated), protected pseudonym and/or protected re-authentication id, to the authenticator 20 in the access network in an EAP Request/AKA-Challenge message. The sending of the re-authentication id depends on 3GPP operator's policies on whether to allow fast re-authentication processes or not. It implies that, at any time, the AAA server 30 decides (based on policies set by the operator) to include the re-authentication id or not, thus allowing or disallowing a triggering of a fast re-authentication process.

The AAA server 30 may send as well a result indication to the authenticator 20 in the access network, in order to indicate that it wishes to protect a success result message at the end of the process, i.e. if the outcome is successful. The protection of result messages depends on home operator's policies.

In step S114 the authenticator 20 in the access network sends the EAP Request/AKA-Challenge message to the UE 10.

In step S115 the UE 10 first checks whether the AMF separation bit in the EAP Request/AKA-Challenge message is set to 1. If this is not the case the UE 10 rejects the authentication. Otherwise, the UE 10 runs AKA algorithms on a USIM application. The USIM application verifies that AUTN is correct and hereby authenticates the network. If AUTN is incorrect, the UE 10 rejects the authentication (not shown in this example). If a sequence number is out of synch, the UE 10 initiates a synchronization procedure. If AUTN is correct, the USIM application computes RES, IK and CK.

Moreover, in step S115 the UE 10 computes (CK_new, IK_new)=F(CK, IK, <access network identity>, <possibly further parameters>) where F is a key derivation function, in the same way as the HSS 40. The UE 10 derives required additional new keying material, including the key MSK, from the new computed IK and CK (i.e. CK_new, IK_new) in the same way as the AAA server 30, and checks the received MAC with the new derived keying material.

If a protected pseudonym and/or re-authentication identity were received, then the UE 10 stores the temporary identity(s) for future authentications.

In step S116 the UE 10 calculates a new MAC value covering the EAP message with the new keying material. The UE 10 sends a message EAP Response/AKA-Challenge containing calculated RES and the new calculated MAC value to the authenticator 20 in the access network. The UE 10 may include in this message a result indication if it received the same indication from the AAA server 30. Otherwise, the UE 10 may omit this indication.

In step S117 the authenticator 20 in the access network sends the EAP Response/AKA-Challenge message to the AAA server 30. In step S118 the AAA server 30 checks the received MAC and compares XRES to the received RES. If all checks in step S118 are successful, in step S119 the AAA server 30 may send a message EAP Request/AKA-Notification, previous to an EAP Success message, if the AAA server 30 requested previously to use protected successful result indications. This message is MAC protected.

In step S120 the authenticator 20 in the access network forwards the message to the UE 10. In step S121 the UE 10 sends the EAP Response/AKA-Notification. In step S122 the authenticator 20 in the access network forwards the EAP Response/AKA-Notification message to the AAA server 30. The AAA server may ignore the contents of this message. In step S123 the AAA server 30 sends an EAP Success message to the authenticator 20 in the access network, which may be preceded by an EAP Notification, as explained in step S120. The AAA server 30 also includes keying material, e.g. the key MSK, in an underlying AAA protocol message (i.e. not at an EAP level). The authenticator 20 in the access network stores the keying material to be used in communication with the authenticated UE 10 as required by the access network.

In step S124, the authenticator 20 in the access network informs the UE 10 about the successful authentication with the EAP Success message. Now the EAP AKA exchange has been successfully completed, and the UE 10 and the authenticator 20 in the access network share keying material derived during that exchange. In step S125 the AAA server may initiate the registration to the HSS 40.

The authentication process may fail at any moment, for example because of unsuccessful checking of MACs or no response from the UE 10 after a network request. In that case, the EAP AKA process will be terminated and an indication should be sent to the HSS 40.

In the following a tunnel full authentication and authorization process of an untrusted access to EPS will be described by way of an embodiment shown in FIG. 2. A tunnel end point in the EPS network is an ePDG 60 acting as an authenticator. As part of a tunnel establishment attempt, use of a certain APN (Access Point Name) is requested. When a new attempt for tunnel establishment is performed by an UE 50 the UE 50 should use IKEv2 (Internet Key Exchange version 2). The authentication of the UE 50 in its role as IKEv2 initiator terminates at an AAA server 30 (3GPP AAA server). The UE 50 may send EAP messages over IKEv2 to the ePDG 60. The ePDG 60 may extract the EAP messages received from the UE 50 over IKEv2, and send them to the AAA server 30. The UE 50 may use Configuration Payload of IKEv2 to obtain a Remote IP address.

EAP-AKA message parameters and procedures regarding authentication are omitted. Only decisions and processes relevant to the use of EAP-AKA within IKEv2 are explained.

As the UE 50 and the ePDG 60 generate nonces as input to derive the encryption and authentication keys in IKEv2, replay protection is provided. For this reason, there is no need for the AAA server 30 to request a user identity again using the EAP-AKA specific methods, because the AAA server 30 is certain that no intermediate node has modified or changed the user identity.

In step S201, the UE 50 and the ePDG 60 exchange a first pair of messages IKE_SA_INIT, in which the ePDG 60 and the UE 50 negotiate cryptographic algorithms, exchange nonces and perform a Diffie_Hellman exchange.

In step S202, the UE 50 sends the user identity (in IDi payload) and APN information (in IDr payload) in a first message of an IKE_AUTH phase, and begins negotiation of child security associations. The UE 50 omits an AUTH parameter in order to indicate to the ePDG 60 that it wants to use EAP over IKEv2. The user identity should be compliant with Network Access Identifier (NAI) format, containing IMSI or a pseudonym, as defined for the EAP-AKA protocol. The UE 50 may send a configuration payload (CFG_REQUEST) within the IKE_AUTH request message to obtain a remote IP Address.

In step S203, the ePDG 60 sends an Authentication Request message with an empty EAP AVP (Attribute Value Pair) to the AAA server 30, containing the user identity and APN. The ePDG 60 should include a PDG-type indicator indicating that the authentication is being performed for tunnel establishment with an ePDG and not an I-WLAN (Interrogating WLAN) PDG. This will help the AAA server 30 to distinguish among authentications for trusted access, as described with respect to FIG. 1, authentications for tunnel setup in I-WLAN which would allow also EAP-SIM (Subscriber Identity Module), and authentications for tunnel setup in EPS which allow only EAP-AKA.

In step S204, the AAA server 30 may fetch a user profile and authentication vectors from the HSS 40 if these parameters are not available in the AAA server 30. The AAA server 30 includes the PDG-type indicator, and the identity of the ePDG in its request to the HSS 40.

Moreover, in step S204, the HSS 40 retrieves an authentication vector from the Authentication Centre with AMF separation bit=1. The HSS 40 then transforms this authentication vector into a new authentication vector by computing (CK_new, IK_new)=F(CK, IK, <PDG-type indicator, ePDG identity>, <possibly further parameters>) where F is a key derivation function. The HSS 40 then sends this transformed authentication vector to the AAA server 30.

It is to be noted that the AAA server 30 does not notice the transformation and treats this authentication vector like any other authentication vector.

In addition, the AAA server 30 may retrieve authentication vectors from the HSS 40 when it detects that a VPLMN selected by a user has changed. This can happen, for example, when a user is performing a VPLMN re-selection procedure and is initiating a new authentication procedure via a new VPLMN. It is to be noted that a user cannot initiate a new authentication procedure.

In step S205, the AAA server 30 initiates an authentication challenge. The user identity is not requested again. In step S206, with a message IKE_AUTH Response, the ePDG 60 responds with its identity, a certificate, and sends the AUTH parameter to protect the previous message it sent to the UE 50 in the IKE_SA_INIT exchange. The ePDG 60 completes the negotiation of the child security associations as well. The EAP message EAP-Request/AKA-Challenge received from the AAA server 30 is included in order to start the EAP procedure over IKEv2.

In step S207, the UE 50 first checks whether the AMF separation bit is set to 1 in the message IKE_AUTH Response received from the ePDG 60. If this is not the case the UE 50 rejects the authentication. Otherwise, the UE 50 runs AKA algorithms on a USIM application and checks the authentication parameters as described with respect to step S115 in FIG. 1.

The UE 50 then computes (CK_new, IK_new)=F(CK, IK, <PDG-type indicator, ePDG identity>, <possibly further parameters>) where F is a key derivation function, in the same way as the HSS 40. The UE 50 derives required additional new keying material, including a key MSK, according to the EAP-AKA protocol from the new computed IK and CK (i.e. CK_new, IK_new) in the same way as the AAA server 30, and in step S207a, responds to the authentication challenge. The only payload (apart from the header) in an IKEv2 message IKE RUTH Request is an EAP message EAP-Response/AKA-Challenge.

In step S208, the ePDG 60 forwards the EAP-Response/AKA-Challenge message to the AAA server 30. In step S209, when all checks are successful, the AAA server 30 sends an Authentication Answer including an EAP success and keying material to the ePDG 60. This keying material should comprise the MSK generated during the authentication process. When Wm* and Wd* interfaces between the ePDG 60 and the AAA server 30 are implemented using Diameter, the MSK may be encapsulated in an EAP-Master-Session-Key parameter.

In step S209a, the ePDG 60 sends an Authorization Request message with an empty EAP AVP to the AAA server 30, containing APN. In step S209b, the AAA server 30 checks in user's subscription (subscription of the UE 50) if the user (the UE 50) is authorized to establish the tunnel. The counter of IKE SAs (Internet Key Exchange Security Associations) for that APN is stepped up. If the maximum number of IKE SAs for that APN is exceeded, the AAA server 30 should send an indication to an ePDG that established the oldest active IKE SA (it could be the ePDG 60 or a different one) to delete the oldest established IKE SA. The AAA server should update the information of IKE SAs active for the APN accordingly.

In step S209c, the AAA server 30 sends an AA-Answer to the ePDG 60. The AAA server 30 may send the IMSI within the AA-Answer, if the Authorization Request message in step S109a contains a temporary identity, i.e. if an AA-Request does not contain the IMSI.

In step S210, the MSK should be used by the ePDG 60 to generate the AUTH parameters in order to authenticate the IKE_SA_INIT phase messages, as specified for IKEv2. These two first messages had not been authenticated before as there was no keying material available yet. A shared secret generated in an EAP exchange, e.g. the MSK, when used over IKEv2, should be used to generated the AUTH parameters.

In step S211, an EAP Success/Failure message is forwarded to the UE 50 over IKEv2. In step S212, the UE 50 may take its own copy of the MSK as input to generate the AUTH parameter to authenticate the first IKE_SA_INIT message. The AUTH parameter is sent to the ePDG 60.

In step S213, the ePDG 60 checks the correctness of the AUTH received from the UE 50. At this point the UE 50 is authenticated. In case S2b reference point is used, PMIP (Proxy Mobile IP) signalling between the ePDG 60 and a PDN GW (Packet Data Network GateWay) (not shown) can start. The ePDG 60 continues with the next step in the procedure described with respect to FIG. 2 only after successful completion of a PMIP binding update procedure.

In step S214, the ePDG 60 calculates the AUTH parameter which authenticates the second IKE_SA_INIT message. The ePDG 60 should send an assigned Remote IP address in a configuration payload (CFG_REPLY). Then the AUTH parameter is sent to the UE 50 together with the configuration payload, security associations and the rest of the IKEv2 parameters and the IKEv2 negotiation terminates.

In step S215, if the ePDG 60 detects that an old IKE SA for that APN already exists, it will delete the IKE SA and send the UE 50 an INFORMATIONAL exchange with a Delete payload in order to delete the old IKE SA in the UE 50.

Figure 3:
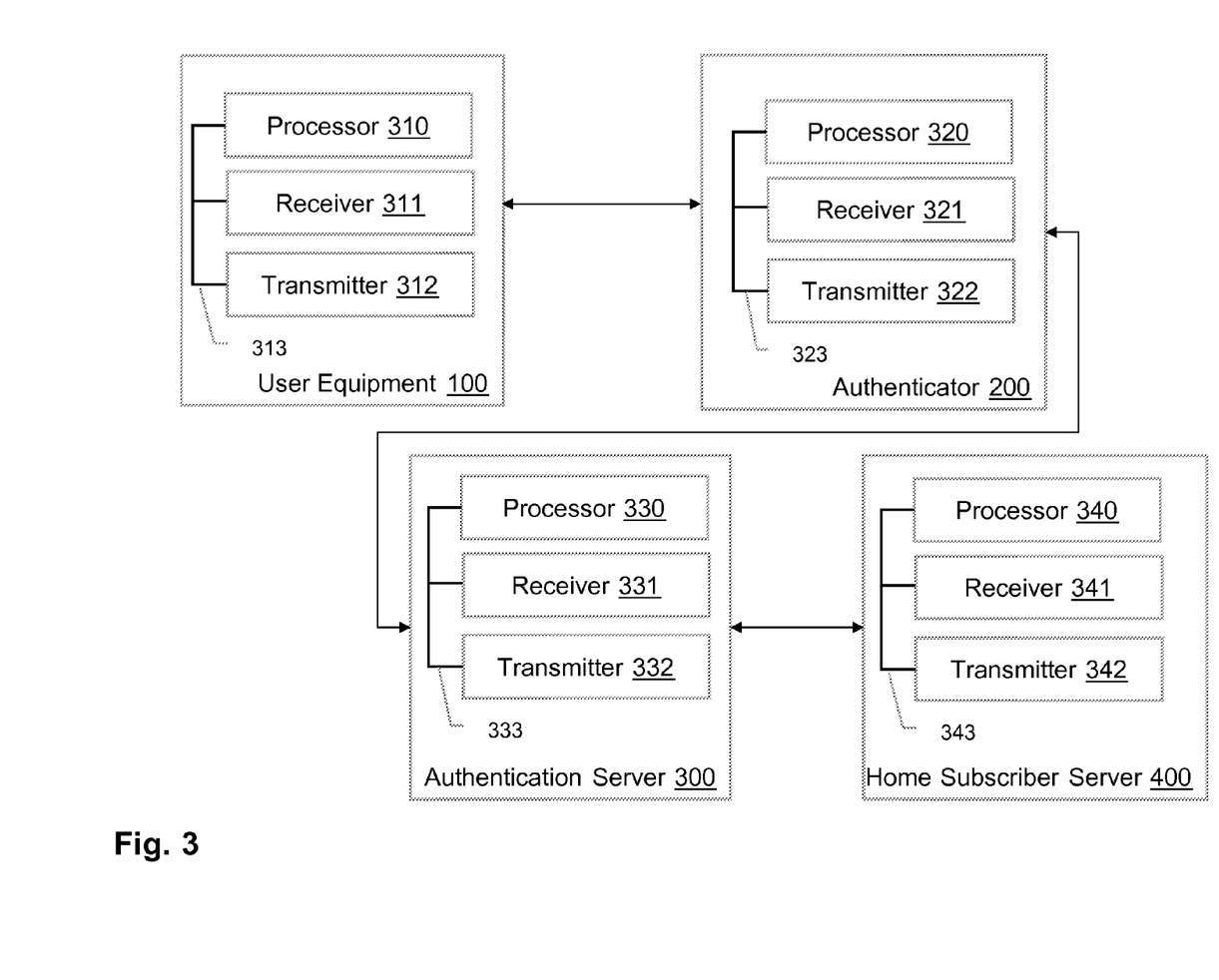
FIG. 3 shows a schematic block diagram illustrating a structure of a user equipment, an authenticator, an authentication server and a home subscriber server according to an embodiment of the invention.

FIG. 3 shows a schematic block diagram illustrating a structure of a user equipment 100, an authenticator 200, an authentication server 300 and a home subscriber server 400 according to an embodiment of the invention. The user equipment 100 may act as the UE 10 shown in FIG. 1 or the UE 50 shown in FIG. 2. The authentication server 300 may act as AAA server shown in FIGS. 1 and 2, and the home subscriber server 400 may act as the HSS 40 shown in FIGS. 1 and 2. The authenticator 200 may act as the authenticator 20 shown in FIG. 1 or as the ePDG 60 shown in FIG. 3.

According to the embodiment shown in FIG. 3, the user equipment 100 comprises a processor 310, a receiver 311 and a transmitter 312, which communicate with each other via a bus 313. The authentication server 300 comprises a processor 330, a receiver 331 and a transmitter 332, which communicate with each other via a bus 333. The home subscriber server 400 comprises a processor 340, a receiver 341 and a transmitter 342, which communicate with each other via a bus 343. The authenticator 200 comprises a processor 320, a receiver 321 and a transmitter 322, which communicate with each other via a bus 323.

The processor 320 of the authenticator 200 controls access from the user equipment 100 to a network, e.g. an EPS network, during authentication between the user equipment and the network, and may cause the transmitter 322 to transmit use information and an identity of the authenticator 200 to the authentication server 300 during the control.

The processor 330 of the authentication server 300 checks whether unused authentication information including a separation indicator (AMF separation bit) which is set (i.e. set to 1) is available for the user equipment 100 during authentication between the user equipment 100 and the EPS network. In case the unused authentication information is not available, the processor 330 includes the use information and the identity of the authenticator 200 controlling access from the user equipment 100 to the EPS network in a request for authentication information and causes the transmitter 331 to transmit the request. The use information may comprise at least one of an indication that the authentication information is for an evolved packet system use and an indicator indicating that the authentication is performed for tunnel establishment with the authenticator 200. The indicator and/or the identity may have been received from the authenticator 200. The identity of the authenticator 200 may comprise at least one of a fully qualified domain name, a mobile country code and a mobile network code.

The receiver 341 of the home subscriber server 400 may receive the request for authentication information from the authentication server 300. The processor 340 of the home subscriber server 400 transforms cryptographic keys (CK, IK) for the user equipment 100 in accordance with the use information into access specific cryptographic keys (CK_new, IK_new) based on the identity of the authenticator 200, and generates the authentication information including the access specific cryptographic keys and a separation indicator (AMF separation bit) which is set (i.e. set to 1) in accordance with the use information, and the transmitter 342 of the home subscriber server 400 transmits the authentication information to the authentication server 300.

The receiver 331 of the authentication server 300 receives the authentication information from the home subscriber server 400, and the processor 330 computes a key (MSK) specific to an authentication method from the access specific cryptographic keys. The authentication method may be based on an extensible authentication protocol method for authentication and key agreement (EAP-AKA).

The processor 310 of the user equipment 100 checks whether a separation indicator (AMF separation bit) included in authentication information is set (i.e. set to 1). The authentication information may be received by the receiver 311 from the authenticator 200 during authentication between the user equipment 100 and the EPS network using extensible authentication protocol method for authentication and key agreement (EAP-AKA). If the separation indicator is set, the processor 310 transforms cryptographic keys (CK, IK) obtained from a USIM (not shown) inserted in the user equipment 100 into access specific cryptographic keys (CK_new, IK_new) based on the identity of the authenticator 200 and computes a key (MSK) specific to the authentication method from the access specific cryptographic keys. The transmitter 312 may transmit authentication messages using the extensible authentication protocol method for the authentication and key agreement.

According to an embodiment of the invention, the home subscriber server 400 receives a request for authentication information from the authentication server 300 and transforms cryptographic keys (CK, IK) for the user equipment 100 into access specific cryptographic keys (CK_new, IK_new) based on the identity of the authenticator 200 controlling access from the user equipment 100 to the EPS network, and generates the authentication information including the access specific cryptographic keys and a separation indicator which is set. The user equipment 100 checks whether the separation indicator included in the authentication information is set, and if the separation indicator is set, transforms cryptographic keys into access specific cryptographic keys based on the identity of the authenticator 200, and computes a key (MSK) specific to an authentication method from the access specific cryptographic keys.

According to an embodiment of the invention as described above, new keys CK_new, IK_new are derived in parallel on a UE and an HSS transparent to an EAP mechanism controlled by an AAA server. These new derived keys cannot be misused for authorization in other networks.

In EPS for non-3GPP untrusted access, cryptographic separation is with authenticator granularity. As described above, involved entities are HSS and ePDG. As a result, one authenticator cannot impersonate another authenticator even when there are several ePDGs (authenticators) per serving PLMN.

In EPS for non-3GPP trusted access, cryptographic separation is per PLMN level as described above. It can be per authenticator as well if the authenticator can provide a meaningful identity to the AAA server.

It is to be understood that the above description of the embodiments is illustrative of the invention and is not to be construed as limiting the invention. Various modifications and applications may occur to those skilled in the art without departing from the true spirit and scope of the invention as defined by the appended claims.

The invention claimed is:

1. An apparatus, configured to:
check whether a separation indicator included in authentication information is set, the authentication information being received during authentication between the apparatus and a core network using an extensible authentication protocol method for authentication and key agreement, the separation indicator indicating whether or not the core network is an evolved packet system network;
if the separation indicator is set, use a key derivation function to transform available cryptographic keys for the apparatus into new cryptographic keys, with the available cryptographic keys and an identifier of an access network via which the apparatus and the core network are communicating being inputs into the key derivation function; and
compute a key to be used in the extensible authentication protocol method from the new cryptographic keys.

2. The apparatus of claim 1, wherein the identifier of the network comprises a mobile country code and a mobile network code.

3. An apparatus comprising:
a processor configured to check whether unused authentication information including a separation indicator which is set is available for a user equipment during authentication between the user equipment and a core network using an extensible authentication protocol method for authentication and key agreement, the separation indicator indicating whether or not the core network is an evolved packet system network;
a receiver; and
a transmitter,
wherein the processor is configured to include use information and an identity of an access network via which the user equipment and the core network are communicating in a request for authentication information and cause the transmitter to transmit the request, in case the unused authentication information is not available,
wherein the receiver is configured to receive new cryptographic keys transformed from available cryptographic keys by means of a key derivation function with the available cryptographic keys and an identifier of the access network being inputs into the key derivation function in accordance with the use information using the identifier of the access network,
and wherein the processor is configured to compute a key to be used in the extensible authentication protocol method from the new cryptographic keys.

4. An apparatus comprising:
a receiver configured to receive a request for authentication information during authentication between a user equipment and a core network using an extensible authentication protocol method for authentication and key agreement, the request including use information and an identifier of an access network via which the user equipment and the core network are communicating;
a processor configured to use a key derivation function to transform cryptographic keys in accordance with the use information into new cryptographic keys with the available cryptographic keys and the identifier of the access network being inputs into the key derivation function, and generate the authentication information including the new cryptographic keys and a separation indicator which is set in accordance with the use information, the separation indicator indicating whether or not the core network is an evolved packet system network, wherein the new cryptographic keys serve as a basis for computing a key to be used in the extensible authentication protocol method; and
a transmitter configured to transmit the authentication information.

5. The apparatus of claim 4, wherein the use information comprises at least one of an indication that the authentication information is for an evolved packet system use and an indicator indicating that an authentication between the user equipment and the network is performed for tunnel establishment with the network.

6. A method comprising:
checking whether a separation indicator included in authentication information is set, the authentication information being received during authentication between a user equipment and a core network using an extensible authentication protocol method for authentication and key agreement, the separation indicator indicating whether or not the core network is an evolved packet system network;
if the separation indicator is set, using a key derivation function to transform available cryptographic keys for the user equipment into new cryptographic keys with the available cryptographic keys and an identifier of an access network, via which the apparatus and the core network are communicating, being inputs into the key derivation function; and
computing a key to be used in the extensible authentication protocol method from the new cryptographic keys.

7. The method of claim 6, wherein the identifier of the access network comprises a mobile country code and a mobile network code.

8. A method comprising:
checking whether unused authentication information including a separation indicator which is set is available for a user equipment during authentication between the user equipment and a core network using an extensible authentication protocol method for authentication and key agreement, the separation indicator indicating whether or not the network is an evolved packet system network;
including use information and an identifier of an access network via which the user equipment and the core network are communicating in a request for authentication information and transmitting the request, in case the unused authentication information is not available;
receiving new cryptographic keys transformed from available cryptographic keys by means of a key derivation function with the available cryptographic keys and the identifier of the access network being inputs into the key derivation function in accordance with the use information using the identity of the network; and
computing a key to be used in the extensible authentication protocol method from the new cryptographic keys.

9. A method comprising:
receiving a request for authentication information during authentication between a user equipment and a core network using an extensible authentication protocol method for authentication and key agreement, the request including use information and an identifier of an access network via which the user equipment and the core network are communicating;
using a key derivation function to transform available cryptographic keys in accordance with the use information into new cryptographic keys with the available cryptographic keys and the identifier of the access network being inputs into the key derivation function; and
generating the authentication information including the new cryptographic keys and a separation indicator which is set in accordance with the use information, the separation indicator indicating whether or not the network is an evolved packet system network, wherein the new cryptographic keys serve as a basis for computing a key to be used in the extensible authentication protocol method; and
transmitting the authentication information.

10. The method of claim 9, wherein the use information comprises at least one of an indication that the authentication information is for an evolved packet system use and an indicator indicating that an authentication between the user equipment and the network is performed for tunnel establishment with the network.

11. A computer program product including a program for a processing device, comprising software code portions for performing the steps of claim 9 when the program is run on the processing device.

12. The computer program product according to claim 11, wherein the computer program product comprises a non-transient computer-readable medium on which the software code portions are stored.

13. The computer program product according to claim 11, wherein the program is directly loadable into an internal memory of the processing device.

14. A method comprising:
checking whether a separation indicator included in authentication information is set, the authentication information being received during authentication between a user equipment and a core network using an extensible authentication protocol method for authentication and key agreement, the separation indicator being set indicating that rather than available cryptographic keys being sent from a home subscriber server transformed new cryptographic keys are sent instead;
if the separation indicator is set, using a key derivation function to transform the available cryptographic keys for the user equipment into the new cryptographic keys with the available cryptographic keys and an identifier of an access network, via which the apparatus and the core network are communicating, being inputs into the key derivation function; and
computing a key to be used in the extensible authentication protocol method from the new cryptographic keys.

15. A method comprising:
receiving a request for authentication information during authentication between a user equipment and a core network using an extensible authentication protocol method for authentication and key agreement, the request including use information and an identifier of an access network via which the apparatus and the core network are communicating;
using a key derivation function to transform available cryptographic keys in accordance with the use information into new cryptographic keys with the available cryptographic keys and an identifier of access the network being inputs into the key derivation function; and
generating the authentication information including the new cryptographic keys and a separation indicator which is set in accordance with the use information, the separation indicator being set indicating that rather than available cryptographic keys being sent from a home subscriber server transformed new cryptographic keys are sent instead, wherein the new cryptographic keys serve as a basis for computing a key to be used in the extensible authentication protocol method; and
transmitting the authentication information.

16. A method comprising:
   checking whether unused authentication information including a separation indicator which is set is available for a user equipment during authentication between the user equipment and a core network using an extensible authentication protocol method for authentication and key agreement, the separation indicator being set indicating that rather than available cryptographic keys being sent from a home subscriber server transformed new cryptographic keys are sent instead;
   including use information and an identifier of an access network via which the apparatus and the core network are communicating in a request for authentication information and transmitting the request, in case the unused authentication information is not available;
   receiving new cryptographic keys transformed from the available cryptographic keys by means of a key derivation function with the available cryptographic keys and an identifier of the access network being inputs into the key derivation function in accordance with the use information using the identity of the network; and
   computing a key to be used in the extensible authentication protocol method from the new cryptographic keys.

* * * * *